(12) United States Patent
Villatel et al.

(10) Patent No.: US 11,119,947 B2
(45) Date of Patent: Sep. 14, 2021

(54) SECURE HARDWARE INITIALIZATION

(71) Applicant: HEWLETT-PACKARD DEVELOPMENT COMPANY, L.P., Spring, TX (US)

(72) Inventors: Maugan Villatel, Bristol (GB); Chris Dalton, Bristol (GB); Carey Huscroft, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,955

(22) PCT Filed: Oct. 30, 2017

(86) PCT No.: PCT/US2017/059070
§ 371 (c)(1),
(2) Date: Oct. 21, 2019

(87) PCT Pub. No.: WO2019/088978
PCT Pub. Date: May 9, 2019

(65) Prior Publication Data
US 2020/0387458 A1 Dec. 10, 2020

(51) Int. Cl.
G06F 13/28 (2006.01)
G06F 12/14 (2006.01)
G06F 21/57 (2013.01)
G06F 21/78 (2013.01)

(52) U.S. Cl.
CPC ......... *G06F 12/1441* (2013.01); *G06F 13/28* (2013.01); *G06F 21/575* (2013.01); *G06F 21/78* (2013.01); *G06F 2212/1052* (2013.01)

(58) Field of Classification Search
None
See application file for complete search history.

(56) References Cited

U.S. PATENT DOCUMENTS

| 6,131,165 | A | 10/2000 | Lipkin et al. |
| 7,380,049 | B2* | 5/2008 | Rajagopal ........... G06F 12/1475 711/1 |
| 7,921,286 | B2 | 4/2011 | Wooten |
| 7,974,416 | B2 | 7/2011 | Zimmer et al. |

(Continued)

FOREIGN PATENT DOCUMENTS

| EP | 3086235 A1 | 10/2016 |
| WO | WO2014025988 A1 | 2/2014 |

OTHER PUBLICATIONS

Cooper, David, "BIOS Protection Guidelines: Recommendations of the National Institute of Standards and Technology." Special Publication (2011): 800-147.

(Continued)

*Primary Examiner* — Elias Mamo
(74) *Attorney, Agent, or Firm* — Trop Pruner & Hu PC

(57) ABSTRACT

A method for secure hardware initialization during a start-up process comprises activating a protected portion of a physical memory, allocating a part of the protected portion of the physical memory for use by direct memory access, DMA, (Continued)

drivers and non-DMA related hardware initialization instructions, and using a memory management tool, allocating a first part of the physical memory, accessible by a device via the memory management tool, for use by data.

20 Claims, 5 Drawing Sheets

(56) References Cited

U.S. PATENT DOCUMENTS

| | | | |
|---|---|---|---|
| 8,631,212 | B2 | 1/2014 | Kegel et al. |
| 9,063,891 | B2* | 6/2015 | Kegel ............... G06F 12/1441 |
| 9,268,594 | B2 | 2/2016 | Shanbhogue et al. |
| 9,363,087 | B2 | 6/2016 | Hawblitzel et al. |
| 9,535,712 | B2 | 1/2017 | Lewis |
| 2004/0003262 | A1* | 1/2004 | England ............... G06F 21/72 |
| | | | 713/189 |
| 2005/0114687 | A1* | 5/2005 | Zimmer ............... G06F 9/4401 |
| | | | 713/193 |
| 2006/0117156 | A1 | 6/2006 | Chai et al. |
| 2006/0129795 | A1 | 6/2006 | Bulusu et al. |
| 2006/0179308 | A1* | 8/2006 | Morgan ............... G06F 21/575 |
| | | | 713/168 |
| 2014/0006805 | A1 | 1/2014 | Colp et al. |
| 2014/0173236 | A1 | 6/2014 | Kegel |
| 2014/0173265 | A1 | 6/2014 | Kegel |
| 2015/0089173 | A1 | 3/2015 | Chhabra et al. |
| 2015/0169224 | A1* | 6/2015 | Alexander ........ G06F 12/0223 |
| | | | 711/162 |
| 2016/0300064 | A1 | 10/2016 | Stewart et al. |
| 2017/0177909 | A1 | 6/2017 | Sarangdhar et al. |

OTHER PUBLICATIONS

Garland, Junior J. (May 6, 2015) Re: Preventing DMA Attacks [Online discussion post] Retrieved from: https://security.stackexchange.com/questions/88629/preventing-dma-attacks.

Zhang, Yulong et al. "HypeBIOS: Enforcing VM Isolation with Minimized and Decomposed Cloud TCB." Virginia Commonwealth University, Technical report (2012).

Bulygin, Yuriy et al. "Summary of Attacks Against BIOS and Secure Boot." Proceedings of the DefCon (2014).

Markuze, Alex et al. "True IOMMU Protection from DMA Attacks: When Copy is Faster than Zero Copy." ACM SIGARCH Computer Architect News 44, No. 2 (2016): 249-262.

Tsang, Derek (Sep. 1, 2015) RE: Best Practices for Mitigating DMA Attacks, [Online discussion post] Retrieved from: https://www.winmagic.com/blog/2015/09/01/best-practices-for-mitigating-dma-attacks/.

Frisk, Ulf. "macOS FileVault2 Password Retrieval," Dec. 15, 2016 [Online]. Available: http://blog.frizk.net/2016/12/filevault-password-retrieval.html (4 pages).

Frisk, Ulf. "PCILeech," dated on or before Oct. 18, 2017 (7 pages).

Goodin, Dan. "World's first (known) bootkit for OS X can permanently backdoor Macs," 2015-Jan. 2015 [Online]. Available, https://arstechnica.com/security/2015/01/worlds-first-known-bootkit-for-os-x-can-permanently-backdoor-macs/ (6 pages).

Yao, Jiewen, et al. "A tour beyond Bios using Intel VT-D for DMA protection in UEFI BIOS." 2015-Jan. 2015 [Online] Available at: https://github.com/vincentjzimmer/Documents/blob/master/A_Tour_Beyond_BIOS_Using_Intel_VT-d_for_DMA_Protection.pdf (27 pages).

* cited by examiner

SECURE HARDWARE INITIALIZATION

BACKGROUND

Direct Memory Access (DMA) is a way for devices to access memory directly without the intervention of the CPU. This can significantly reduce CPU load, as the CPU does not need to read data in dynamic random-access memory (DRAM) and then push it to the device, or the other way around. Well-behaved devices will typically be fully under the control of a driver running in the Operating System (OS), and will only DMA when and where the driver wants it.

BRIEF DESCRIPTION OF THE DRAWINGS

Various features of certain examples will be apparent from the detailed description which follows, taken in conjunction with the accompanying drawings, which together illustrate, by way of example only, a number of features, and wherein.

DETAILED DESCRIPTION

Figure 1:
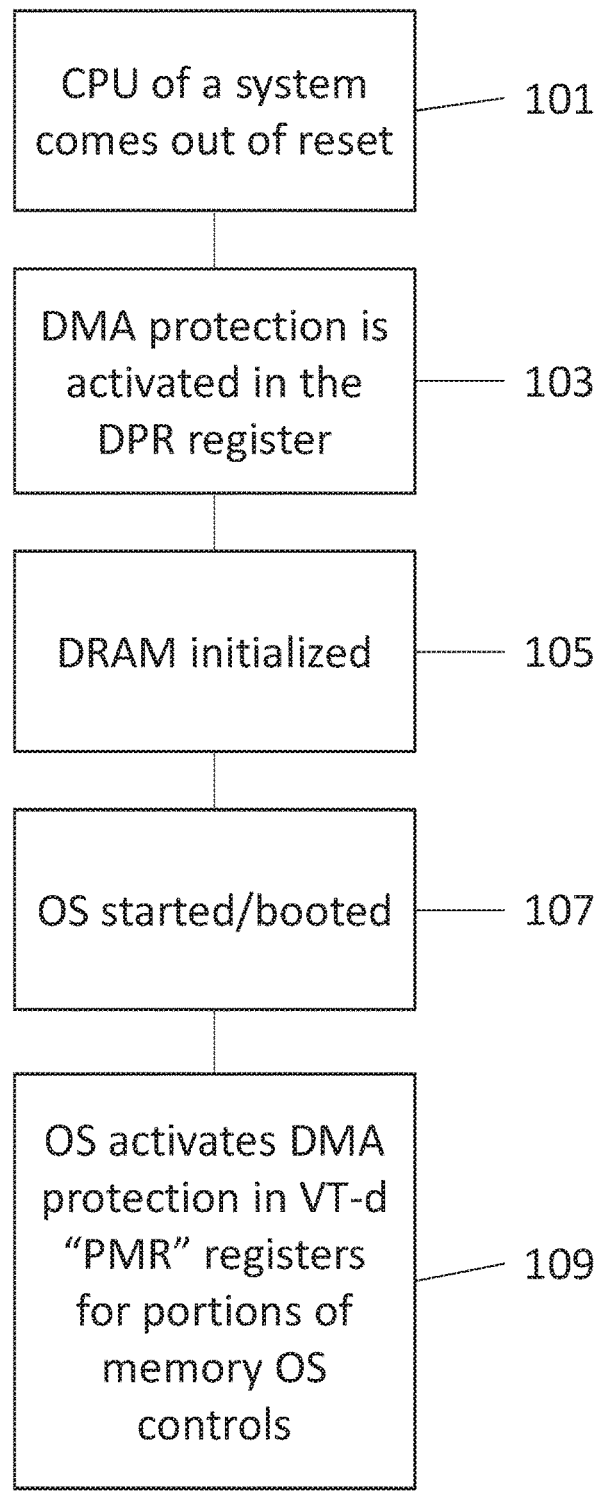
FIG. 1 is a flowchart of a boot process according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

DMA attacks are a growing concern in computer security. They are very powerful, cheap, and increasingly easy to carry out due to the introduction of external DMA ports like Thunderbolt, making them very attractive to potential attackers.

There has been an increasing number of attacks using rogue DMA devices to attack systems. These attacks typically involve rogue PCIe devices that attackers would plug in to a system. PCIe (Peripheral Component Interconnect Express) is a high-speed bus that (among other things) allows PCIe devices to issue DMA transactions. It is, for example, used in desktops to connect a discrete graphics card to the motherboard.

Due to how DMA was designed, the device could then read or write any portion of memory (with the notable exception of System Management RAM SMRAM) without system software being aware of it happening, thus allowing attackers to compromise a system and/or retrieve encryption keys and other sensitive secrets from memory.

Being the first software executing on a platform, the basic input/output system (BIOS) has a critical role in enabling protection against potential rogue DMA devices, and then passing this protection to the Operating System. Failure to do so would enable an attacker to bypass security technologies like the Unified Extensible Firmware Interface (UEFI) Secure Boot for example. Recently, EFI firmware started to be a target for these attacks.

Historically, (except in the case of microkernels) drivers for all devices were running as part of the Operating System with very high privileges. However, with the growing popularity of virtualisation and hypervisors, systems started to be shared among multiple, mutually-untrusted operating systems, separated by a hypervisor. Sharing devices between those different operating systems incurred a non-negligible performance cost, which is why there was a desire to be able to assign some peripherals to one single guest, so the guest could get the full performance of that device.

However, if this device was capable of issuing DMA transactions, it could allow the guest to read or write memory belonging to other guests, or to the hypervisor. As a result, chip makers started to develop input-output memory management unit (IOMMU) technology, which allows a privileged software (hypervisor) to restrict what memory a given DMA-capable device is able to access. This allowed hypervisors to ensure that a device assigned to a specific guest would only ever be able to read or write memory belonging to that guest. More generally, it allowed to "de-privilege" drivers of DMA-capable device, by ensuring a low-privilege driver could not order a device to DMA into memory not belonging to the driver.

According to an example, there is provided a method to secure devices against DMA attacks to prevent a DMA device from replacing executable code in memory with malicious code. For example, in a boot process, a BIOS can load itself into memory and continue its execution there. However, a DMA-capable attacker could potentially modify this image of the BIOS in memory and replace it with his own malicious BIOS. As BIOS will start executing from memory before initializing and locking SMM, the attacker could even take control of SMM.

Similarly, a trusted platform module (TPM) trusted boot module expects that software measures an image, sends that measurement to the TPM, and then executes that image. However, an attacker could potentially use DMA to modify the image between the moment it has been measured and the moment it is executed. He could also more simply attack the code responsible for measuring the image and sending the measurement to the TPM. This in turn impacts the security offered by technologies which rely on Trusted Boot and the TPM to make sure that the encryption key is only released when an expected process has been booted.

Similar to the attack on Trusted Boot, an attacker can attack UEFI Secure Boot by modifying a UEFI image between the moment it is authenticated and the moment it is executed, or attack and deactivate the code responsible for doing the authentication.

According to an example, no window is left in which DRAM is not protected from DMA so that BIOS/EFI firmware and an Operating System, which relies on DRAM to store code, data etc., can be comprised.

There are several available DMA protection capabilities:

The Intel DPR ("DMA Protected Range") register, which is present in all recent Intel chipsets. It allows up to 256 MB of physical memory below the top of main memory segment (TSEG) to be protected against all DMA. It makes sure that only the processor can access this region of memory, and this register can also be locked until the next reboot. The areas of memory occupied by TSEG forms a memory hole with respect to OS such that the OS cannot see the TSEG area.

Intel VT-d—PMR ("Protected Memory Registers") includes registers that can define one region in low-memory and one region in high memory as being protected against DMA coming from downstream devices. These registers are described as a way to securely start to setup VT-d pagetables in memory.

Intel VT-d—Pagetables define what portion of memory downstream devices will be able to access. All other parts of memory will thus be protected against DMA coming from those devices. Pagetables must however be set up in memory, which implies that they cannot be used before memory is initialized, and that while they are being set up they must be protected from DMA using the PMR.

Similarly to the above, IOMMU (input-output memory management unit) can be used to provide memory management, and can connect a direct-memory-access-capable (DMA-capable) I/O bus to the main memory of a system. That is, there are different IOMMU specifications that can be used. For example, I/O Virtualization Technology, "AMD-Vi", originally called IOMMU as well as the Virtualization Technology for Directed I/O (VT-d).

According to an example, there is provided a method for secure hardware initialization during a start-up process. Initially, when a CPU comes out of reset, there are two ways to protect memory against DMA: the DPR and PMR. In an example, the DPR is used for early BIOS protection, as they are reserved for BIOS use (the BIOS can lock them), are independent from any IOMMU translation, and do not depend on having VT-d available on the platform. However, they can only protect 256M of memory just below TSEG. Therefore, in an example, while a BIOS is still executing in place from flash/Cache As RAM (i.e. during a pre-EFI initialisation phase, PEI), those registers are set so that the regions of DRAM that the BIOS will use will be DMA protected.

Since some drivers (e.g. platform initialisation drivers) that control DMA-capable devices will allocate memory outside of the protected region (otherwise the device will not work), the DPR protection is, in an example, disabled after SMRAM has been locked.

As such, there is a stronger assurance that SMRAM is what it should be, even in the event of malicious DMA device.

Subsequently, according to an example, the protection is extended to the entire BIOS, up to when the OS is ready to boot. In an example, the same DPR register can continue to be used to protect the BIOS. As such, drivers should allocate "normal" memory in the DMA-protected region, and drivers of DMA devices should allocate memory outside of that area.

In another example, a Driver Execution Environment (DXE) driver that enables VT-d in the BIOS can be provided. This can set up VT-d mappings so that the entire BIOS can be DMA-protected, and then disable the DPR protection. This enables hooking into existing Map( ) and Unmap( ) functions that DMA drivers call when doing DMA transactions, and setup specific VT-d mappings that would allow DMA just for these specific regions.

According to an example, for a handover to the OS, the OS can have the VT-d PMR (protected memory range) registers available, which enables the OS to retrieve full control of VT-d.

FIG. 1 is a flowchart of a boot process according to an example. In block 101 a CPU of a system comes out of reset (e.g. the system is powered on). In block 103, DMA protection is activated in the DPR registers, and in block 105 DRAM is initialized. The processes in blocks 103 and 105 may be reversed. That is, DRAM can be initialized before DPR (or similar) has been used. In an example, for security, the integrity of something in DRAM (e.g. CPU instructions, critical data) should not be depended on when the DRAM is not protected. As an alternative, the following flow is valid: Initialize DRAM; Activate protections; Start relying on things in DRAM.

At this point, DRAM can be used normally (within the DMA-protected region), but DMA driver code and data is allocated in the DMA protected region, as a device is not supposed to touch those and a dedicated portion of non-protected memory can be allocated in order to enable communication with the device.

In block 107, the OS is started, and in block 109 the OS activates DMA protection in the VT-d "PMR" registers for portions of memory that the OS controls. The OS would set up VT-d pagetables there to protect only itself, as BIOS would still be under DPR protection. In an example, an OS can use VT-d pagetables instead of/in addition to PMR.

Figure 2:
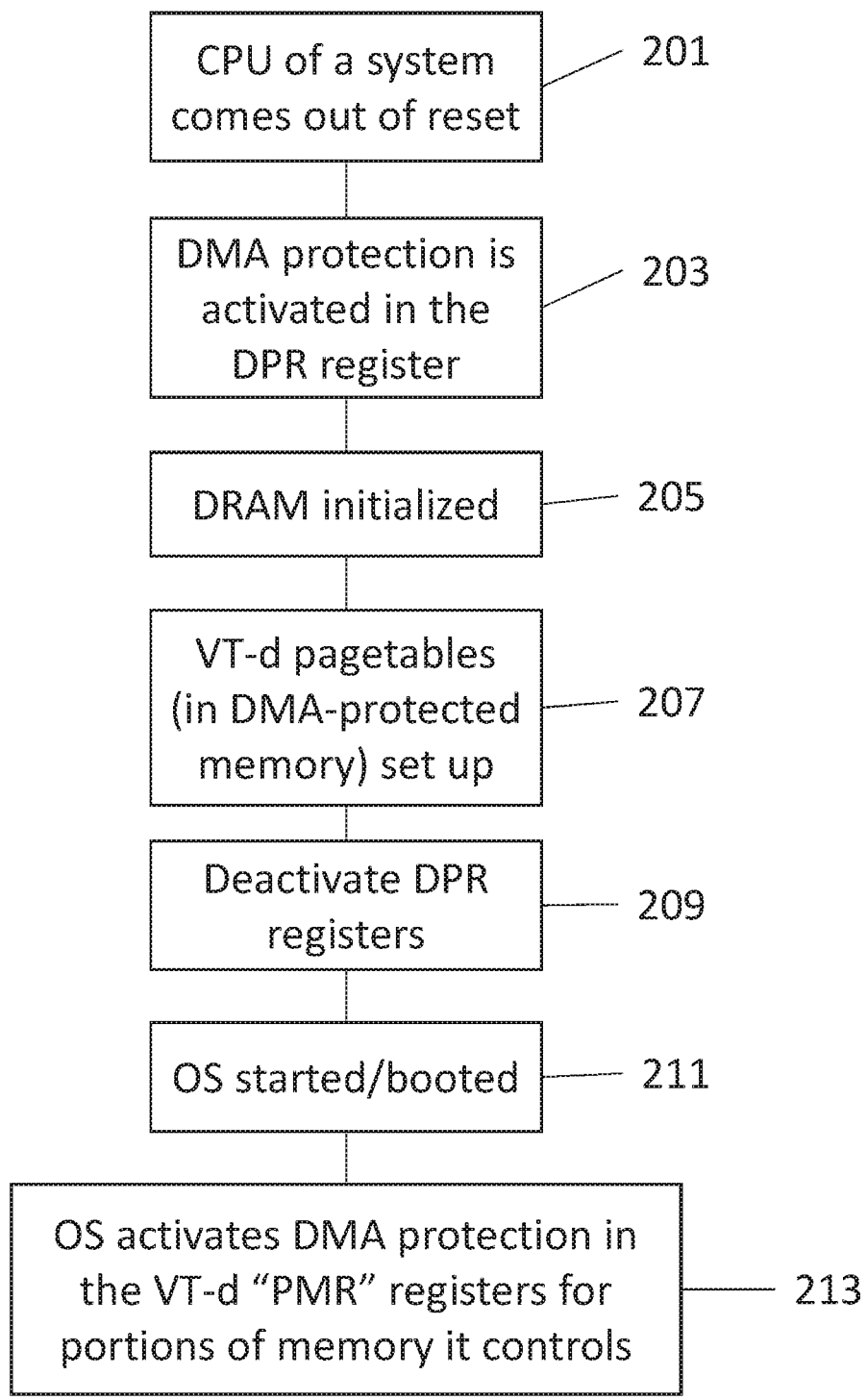
FIG. 2 is a flowchart of a boot process according to an example.

FIG. 2 is a flowchart of a boot process according to an example. More particularly, FIG. 2 is a flowchart of a boot process using VT-d pagetables to minimize breaking changes according to an example. In block 201 a CPU of a system comes out of reset (e.g. the system is powered on). In block 203, DMA protection is activated in the DPR registers, and in block 205 DRAM is initialized. As before, at this point, DRAM can be used normally (within the DMA-protected region). In block 207, VT-d pagetables (in DMA-protected memory) are set up to ensure that the DRAM region containing the BIOS code and the VT-d mappings will be protected a second time and devices are isolated from each other, if desired. Once those mappings are set-up, the DPR registers that offered the early DMA-protection are deactivated in block 209.

In block 211 the OS is started, and in block 213 it activates DMA protection in the VT-d "PMR" registers for portions of memory that the OS controls. That is, the OS sets up VT-d pagetables there that protects memory regions containing runtime BIOS code, like ACPI tables and UEFI Runtime Services (SMRAM should not be a concern as it is always DMA-protected). If at that point the OS still relies on UEFI drivers doing DMA, the pagetables it sets up should take that into account.

Figure 3:
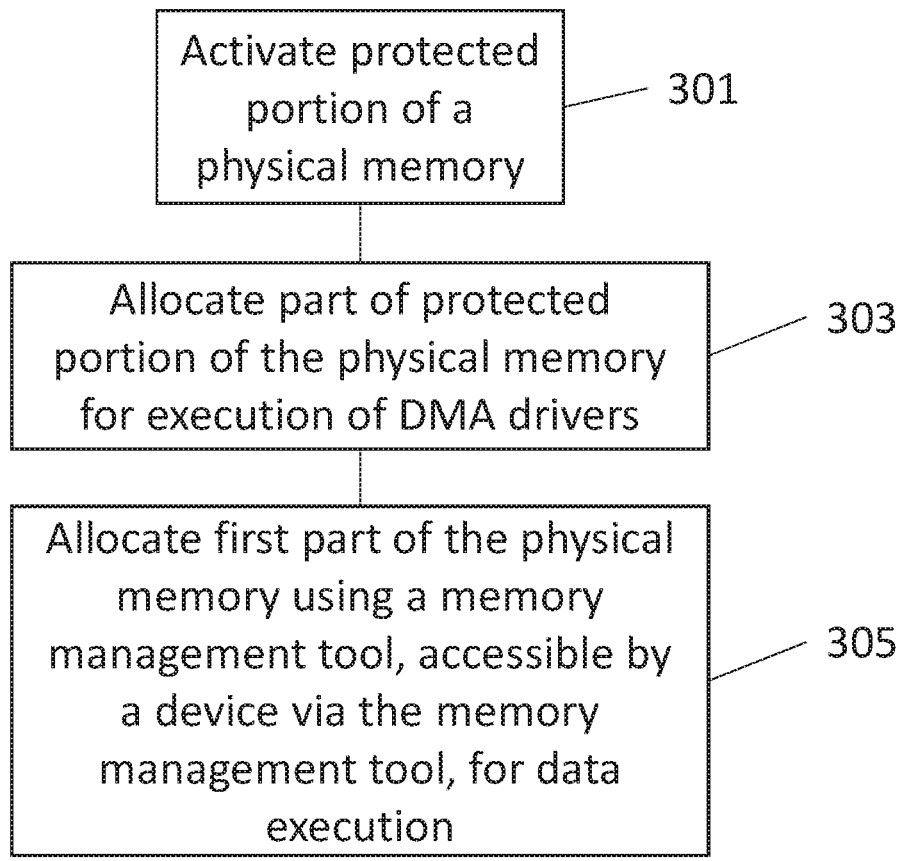
FIG. 3 is a flowchart of a method for secure hardware initialization during a start-up process according to an example.

FIG. 3 is a flowchart of a method for secure hardware initialization during a start-up process according to an example. In block 301, a protected portion of a physical memory is activated. For example, as noted above, DMA protection can be activated in the DPR registers. In block 303, a part of the protected portion of the physical memory is allocated for execution of direct memory access drivers. In block 305, a first part of the physical memory, accessible by a device via a memory management tool, is allocated for data execution using the memory management tool. For example, the memory management tool can be the IOMMU or Vt-d controller.

Figure 4:
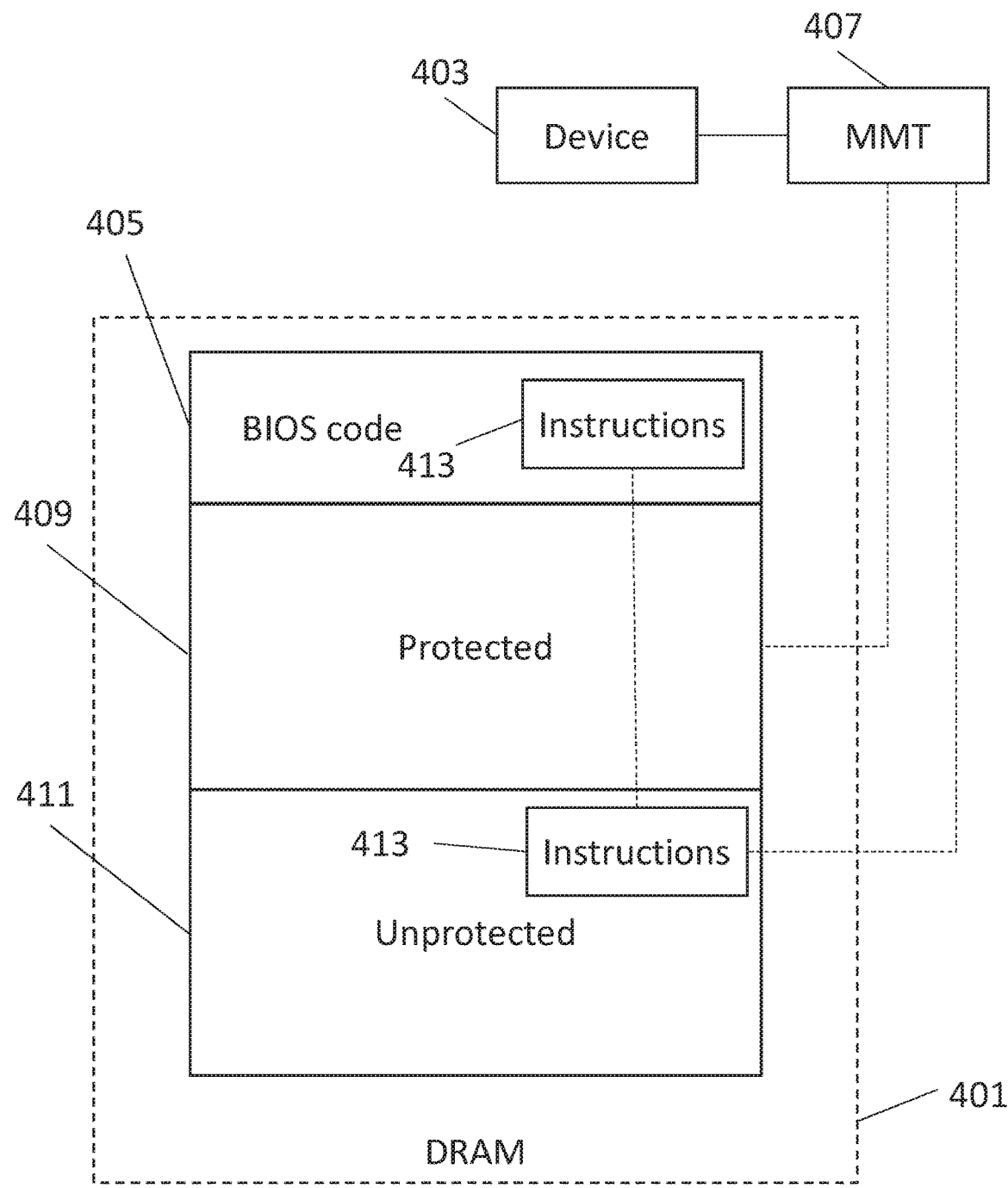
FIG. 4 is a schematic representation of a system according to an example.

FIG. 4 is a schematic representation of a system according to an example. A portion of DRAM 401 of a device 403 is depicted. A protected (DPR) region 405 of the RAM 401 is depicted. In an example, as described above, BIOS and driver instructions can be executed in region 405. A memory management tool (MMT) 407 can be used to allocate a first protected region 409 of the memory 401 that can only be accessed by the device 403 via the tool 407. An unprotected region 411 of memory 401 can remain for use by device 403. In an example, data (e.g. an executable) is received from device 403. It can then be copied to the protected region (405/409) where it can be authenticated. If authentic, the data can be executed.

In an example, as VT-d pagetables are dynamic, protected/unprotected portions can be reassigned at will. Accordingly, a device can DMA into unprotected memory, then protect this memory, and then authenticate it.

Figure 5:
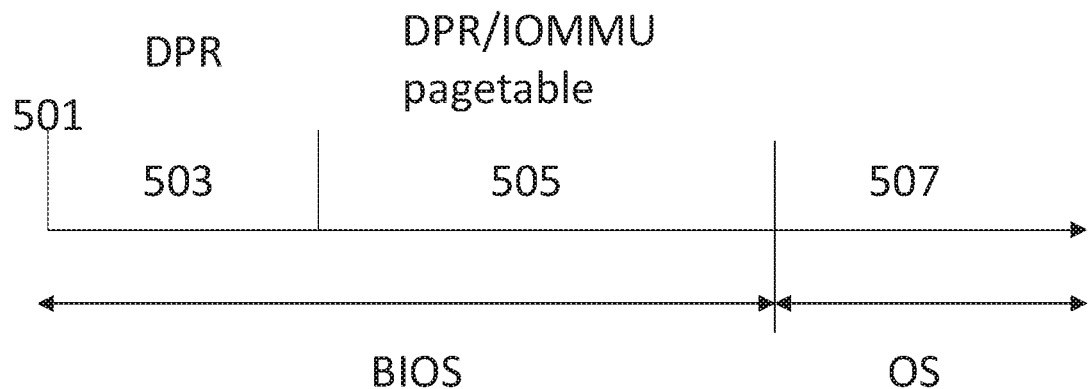
FIG. 5 is a schematic representation of a boot process according to an example.

FIG. 5 is a schematic representation of a boot process according to an example. During the time period when a device (e.g. device 403) BIOS is executing from power up 501, there are two processes that are provided, according to an example, to secure hardware initialization during the start-up process. In 503 of the BIOS process, DPR is used, and in 505 of the BIOS process, DPR/IOMMU pagetables are used up until 507 when there is handover to the OS.

Examples in the present disclosure can be provided as methods, systems or machine-readable instructions. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus may be implemented by a processor executing machine readable instructions stored in a memory, or a processor operating in accordance with instructions embedded in logic circuitry. The term 'processor' is to be interpreted broadly to include a CPU, processing unit, ASIC, logic device, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 6:
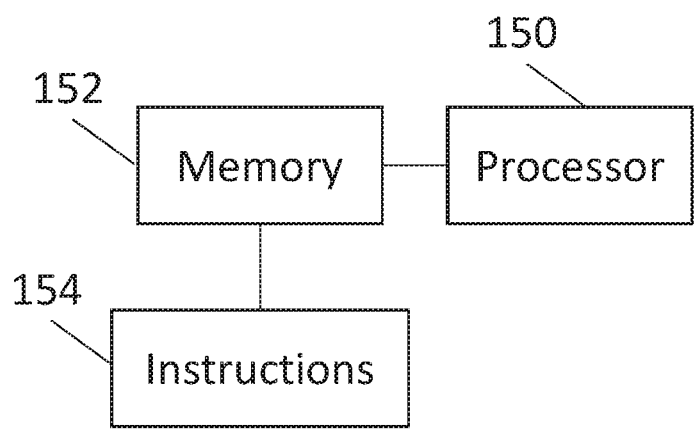
FIG. 6 shows an example of a processor associated with a memory according to an example.

FIG. 6 shows an example of a processor 150 associated with a memory 152. The memory 152 comprises computer readable instructions 154 which are executable by the processor 150. The instructions 154 can comprise instructions to activate a protected portion of a physical memory, instructions to allocate a part of the protected portion of the physical memory for execution of direct memory access drivers, and instructions to using a memory management tool, allocate a first part of the physical memory, accessible by a device via the memory management tool, for data execution.

Such machine-readable instructions may also be loaded onto a computer or other programmable data processing devices, so that the computer or other programmable data processing devices perform a series of operations to produce computer-implemented processing, thus the instructions executed on the computer or other programmable devices provide a operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for secure hardware initialization during a start-up process of a system, the method comprising:
   activating a protected portion of a physical memory, wherein the physical memory is writable by devices in the system, and the protected portion contains basic input/output system (BIOS) code, and wherein activating the protected portion protects the BIOS code against direct memory access (DMA) during execution of the BIOS code;
   allocating a first part of the physical memory for use by a DMA driver; and
   allocating, using a memory management tool, a second part of the physical memory, wherein data in the second part of the physical memory is accessible by a DMA device via the memory management tool.

2. The method of claim 1, further comprising:
   copying or moving the data located in the second part of the physical memory into the protected portion.

3. The method of claim 1, further comprising:
   authenticating the data in the second part of the physical memory prior to use of the data.

4. A system comprising:
   a physical memory;
   a processor to:
      activate a protected portion of the physical memory during a system start-up process, the physical memory writable by devices in the system, and the protected portion to contain basic input/output system (BIOS) code, wherein activating the protected portion protects the BIOS code against direct memory access (DMA) during execution of the BIOS code, and
      assign a first part of the physical memory for use by a DMA driver;

a memory management tool executable to:

allocate a second part of the physical memory, wherein the second part is accessible by a DMA device via the memory management tool.

5. A non-transitory machine-readable storage medium comprising instructions that upon execution cause a system to:

activate a protected portion of a physical memory during a start-up of the system, the physical memory writable by devices in the system, and the protected portion containing basic input/output system (BIOS) code, wherein activating the protected portion protects the BIOS code against direct memory access (DMA) during execution of the BIOS code; and allocate, using a memory management tool, a first part of the physical memory, wherein the first part is accessible by a DMA device via the memory management tool.

6. The method of claim 1, wherein the activating of the protected portion of the physical memory comprises activating a register that defines a memory range of the protected portion.

7. The method of claim 6, further comprising:

subsequent to activating the register:

setting up a mapping that defines a first memory region of the physical memory accessible by the DMA device, wherein a second memory region different from the first memory region is protected against DMA access, and wherein the second memory region is different from the protected portion, and storing the BIOS code in the second memory region.

8. The method of claim 7, further comprising:

after setting up the mapping, deactivating the register to deactivate the protected portion.

9. The method of claim 7, wherein the setting up of the mapping is performed by an operating system.

10. The method of claim 9, wherein the activating of the protected portion occurs prior to starting the operating system.

11. The system of claim 4, wherein the activating of the protected portion of the physical memory is based on an activation of a register that defines a memory range of the protected portion.

12. The system of claim 11, wherein the processor is to:

subsequent to the activation of the register:

set up a mapping that defines a first memory region of the physical memory accessible by the DMA device, wherein a second memory region different from the first memory region is protected against DMA access, and wherein the second memory region is different from the protected portion, and store the BIOS code in the second memory region.

13. The system of claim 12, wherein the processor is to:

after setting up the mapping, deactivate the register to deactivate the protected portion.

14. The system of claim 12, further comprising an operating system to set up the mapping.

15. The system of claim 14, wherein the processor is to activate the protected portion prior to starting the operating system.

16. The non-transitory machine-readable storage medium of claim 5, wherein the activating of the protected portion of the physical memory is based on an activation of a register that defines a memory range of the protected portion.

17. The non-transitory machine-readable storage medium of claim 16, wherein the instructions upon execution cause the system to:

subsequent to the activation of the register:

set up a mapping that defines a first memory region of the physical memory accessible by the DMA device, wherein a second memory region different from the first memory region is protected against DMA access, and wherein the second memory region is different from the protected portion, and store the BIOS code in the second memory region.

18. The non-transitory machine-readable storage medium of claim 17, wherein the instructions upon execution cause the system to:

after setting up the mapping, deactivate the register to deactivate the protected portion.

19. The non-transitory machine-readable storage medium of claim 17, wherein the instructions upon execution cause the system to:

set up the mapping using an operating system.

20. The non-transitory machine-readable storage medium of claim 19, wherein the instructions upon execution cause the system to:

activate the protected portion prior to starting the operating system.

* * * * *